No. 626,107. Patented May 30, 1899.
M. H. STARLING.
WIRE FENCE MACHINE.
(Application filed Nov. 21, 1898.)
(No Model.) 6 Sheets—Sheet 1.

WITNESSES:
Jos. A. Ryan
P. B. Turpin

INVENTOR
Miles H. Starling
BY Munn & Co.
ATTORNEYS.

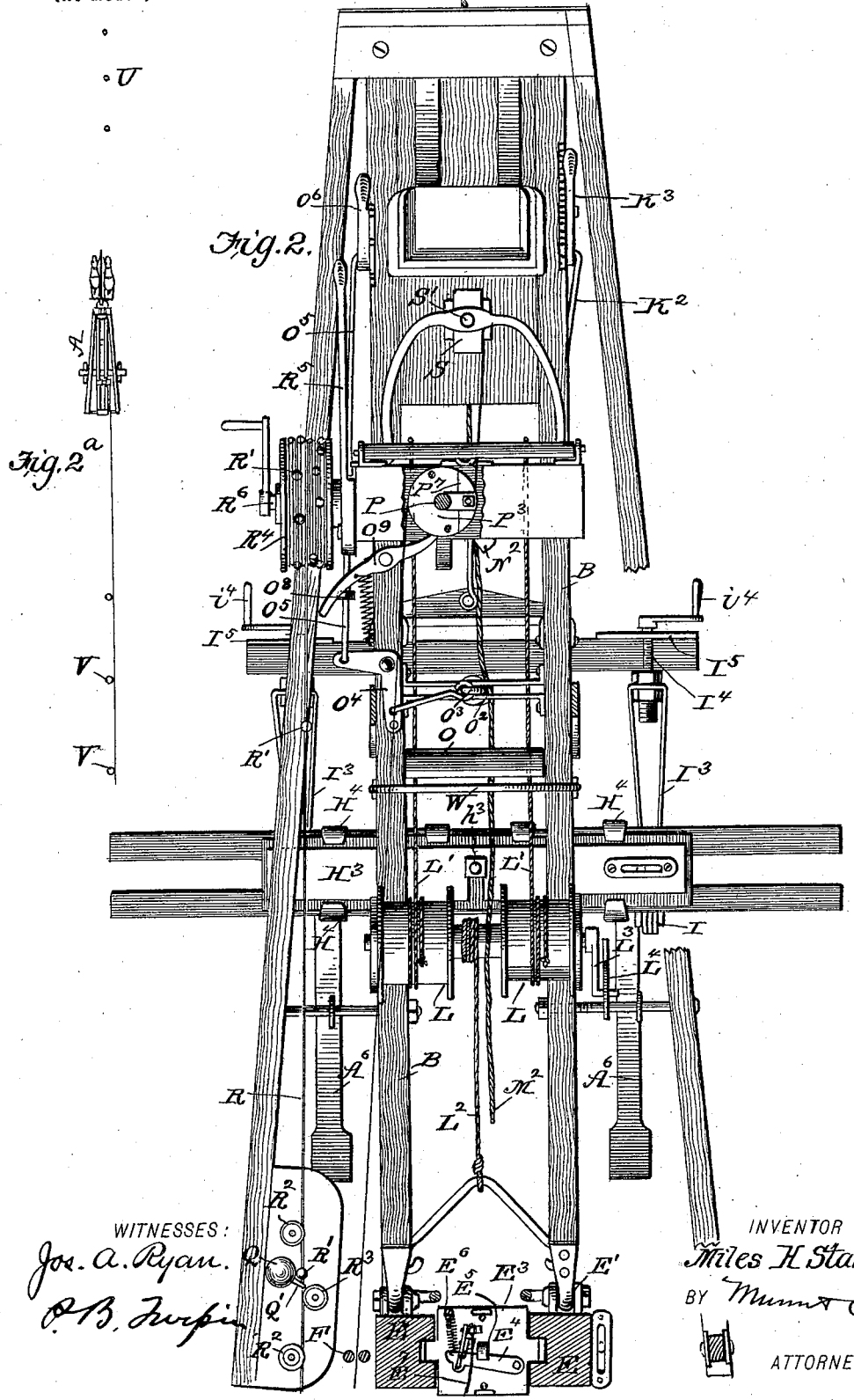

No. 626,107. Patented May 30, 1899.
M. H. STARLING.
WIRE FENCE MACHINE.
(Application filed Nov. 21, 1898.)
(No Model.) 6 Sheets—Sheet 3.
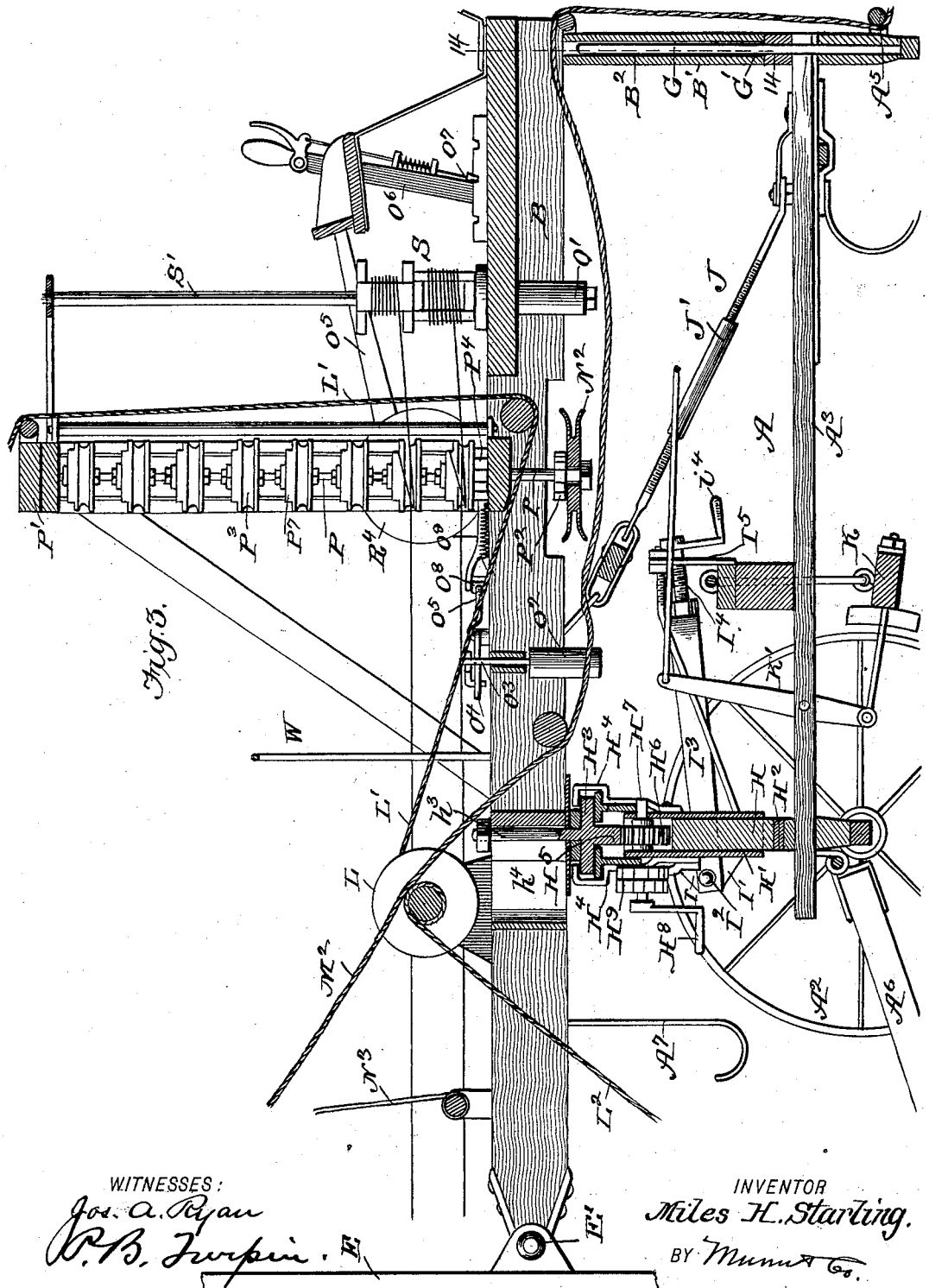
WITNESSES:
Jos. A. Ryan
P. B. Turpin.
INVENTOR
Miles H. Starling.
BY Munn & Co.
ATTORNEYS.

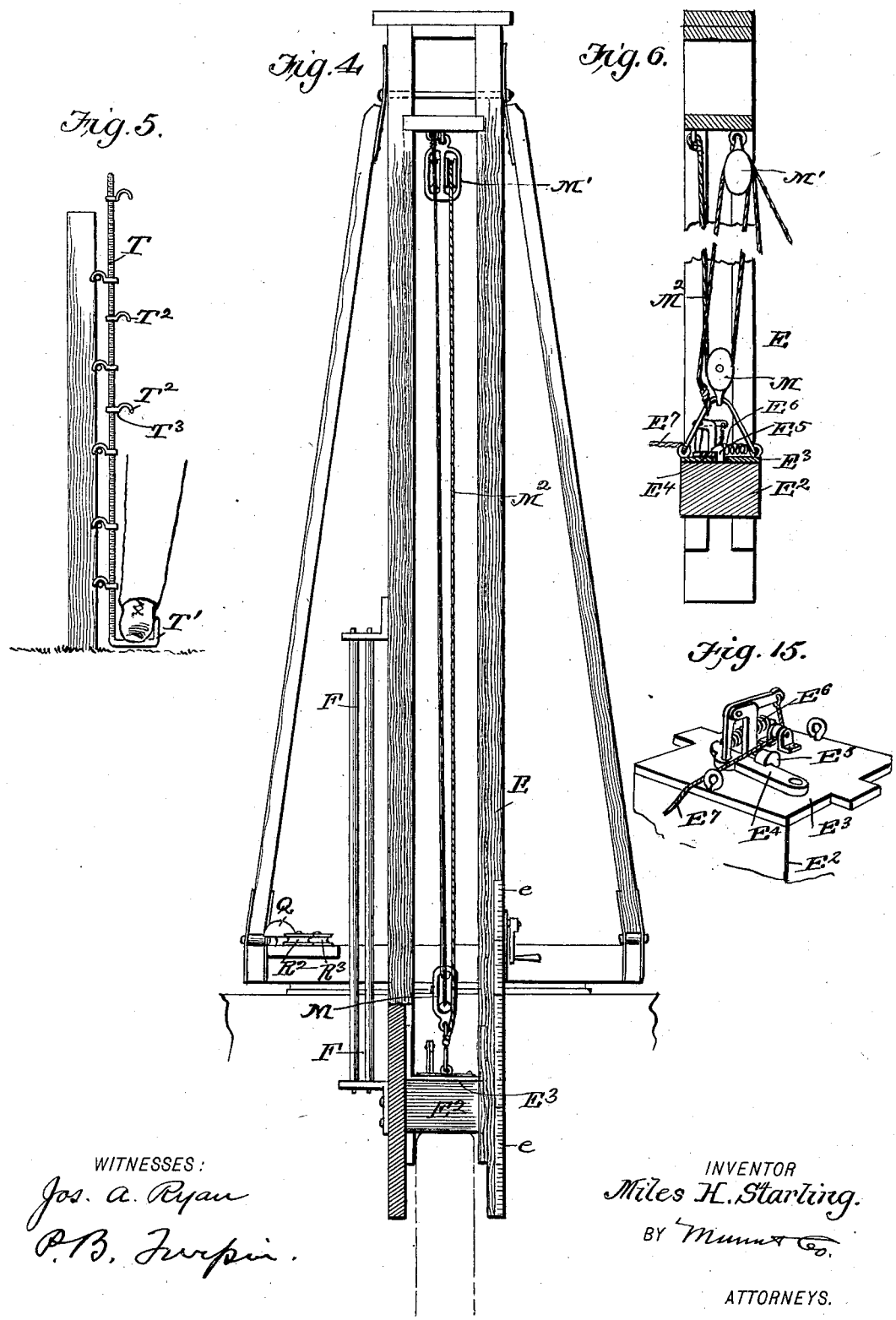

No. 626,107. Patented May 30, 1899.
M. H. STARLING.
WIRE FENCE MACHINE.
(Application filed Nov. 21, 1898.)
(No Model.) 6 Sheets—Sheet 5.
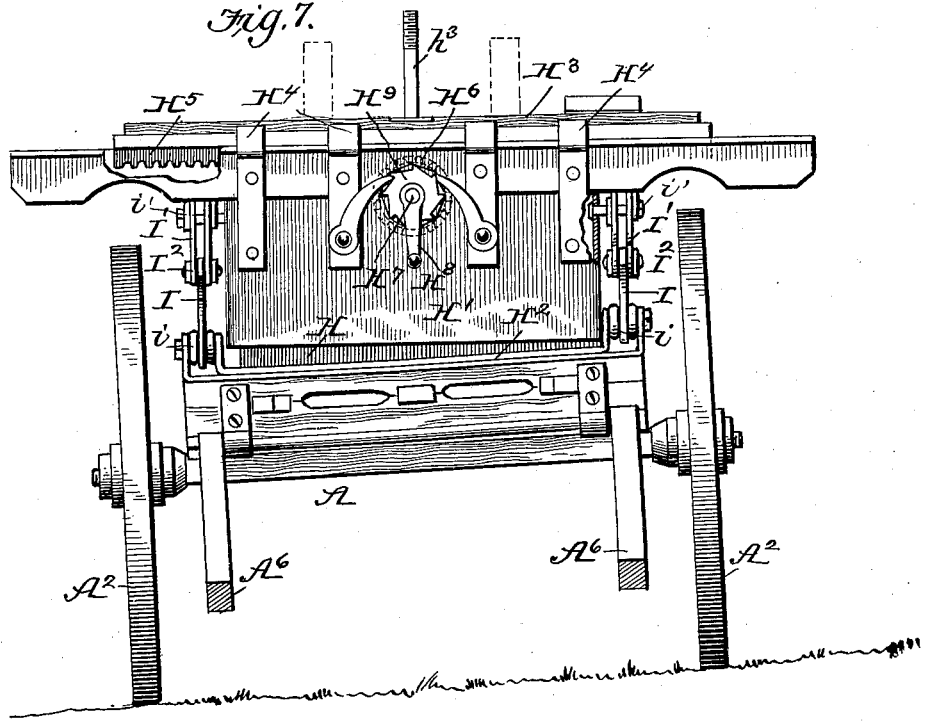
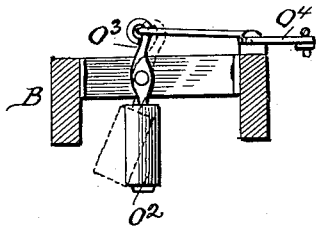
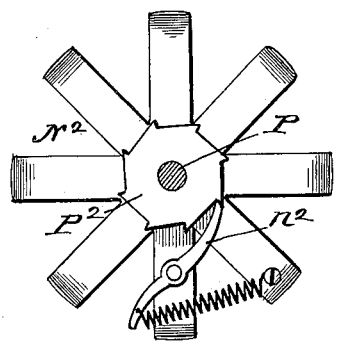
WITNESSES:
Jos. A. Ryan
P. B. Turpin
INVENTOR
Miles H. Starling.
BY Munn & Co.
ATTORNEYS.

No. 626,107. Patented May 30, 1899.
M. H. STARLING.
WIRE FENCE MACHINE.
(Application filed Nov. 21, 1898.)
(No Model.) 6 Sheets—Sheet 6.

WITNESSES:
Jos. A. Ryan
P. B. Turpin.

INVENTOR
Miles H. Starling.
BY Munn & Co.
ATTORNEYS.

UNITED STATES PATENT OFFICE.

MILES H. STARLING, OF LOWELL, OHIO.

WIRE-FENCE MACHINE.

SPECIFICATION forming part of Letters Patent No. 626,107, dated May 30, 1899.

Application filed November 21, 1898. Serial No. 697,012. (No model.)

*To all whom it may concern:*

Be it known that I, MILES H. STARLING, residing at Lowell, in the county of Washington and State of Ohio, have made certain new and useful Improvements in Wire-Fence Machines, of which the following is a specification.

My invention is an improvement in machines for use in erecting wire fences, and has for an object, among others, to provide a machine by which to drive the posts, space same apart, lay the wire, and stretch the wire and which can be used on level ground or on a hillside, as may be required; and the invention consists in certain novel constructions and combinations of parts, as will be hereinafter described, and pointed out in the claims.

Figure 1:
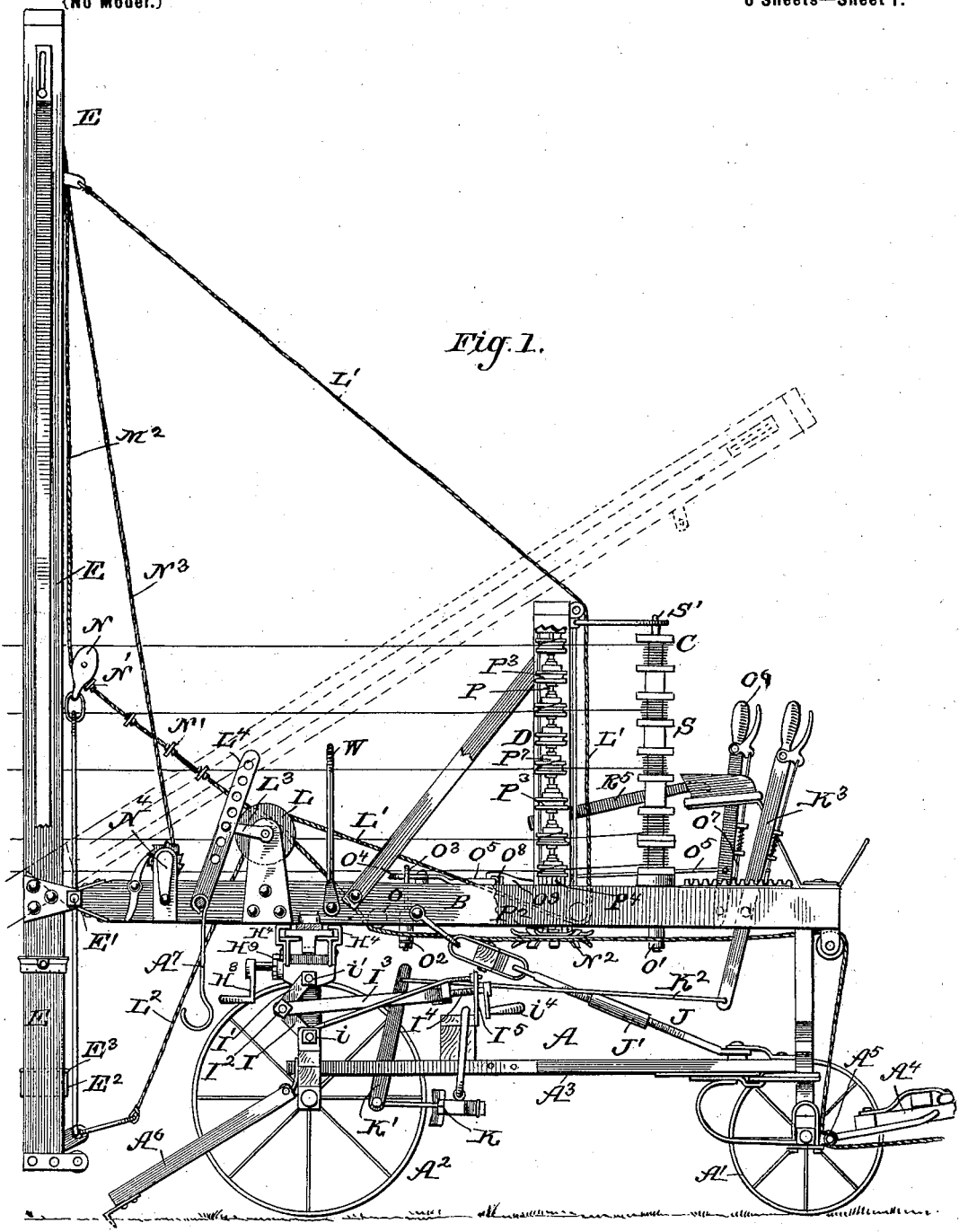
Figure 10:
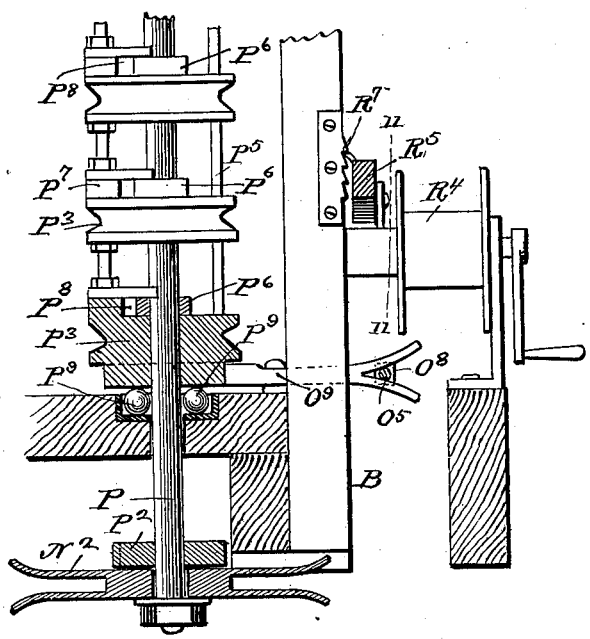
Figure 11:
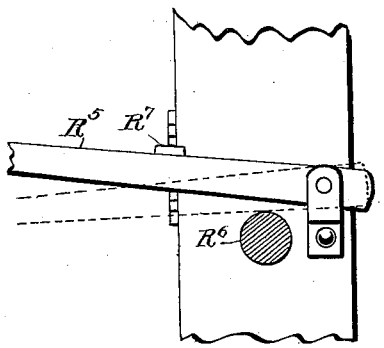
Figure 12:
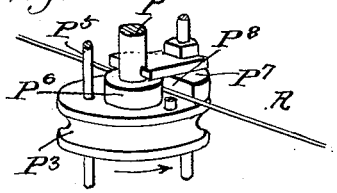
Figure 14:
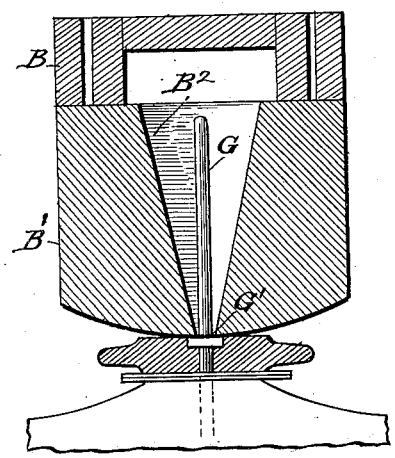

In the drawings, Figure 1 is a side elevation of a machine embodying my invention. Fig. 2 is a top plan view thereof, parts being broken away and others shown in section. Fig. $2^a$ is a diagrammatic top plan view illustrating the operation of the machine. Fig. 3 is a vertical longitudinal section of the machine. Fig. 4 is an elevation of the machine, showing the post-driver, parts being removed and others shown in section. Fig. 5 is a detail view illustrating the gage for regulating the wire strands alongside the fence. Fig. 6 is a detail vertical section of a part of the post-driver. Fig. 7 is a detail rear elevation of the rear adjustable bolster. Fig. 8 is a detail view of the shifting guide-pulley. Fig. 9 is a detail view of the armed operating-pulley of the wire-stretcher. Fig. 10 is a detail view, part in section, of the wire-tightener. Fig. 11 is a detail view on about line 11 11 of Fig. 10. Fig. 12 is a detail perspective, and Fig. 13 a detail sectional plan, of a part of the wire-stretcher. Fig. 14 is a detail section on about line 14 14 of Fig. 3, and Fig. 15 is a detail view illustrating the latch devices for detachably connecting the pile-driving weight with the plate for lifting the same.

My improved machine or apparatus embodies a base-frame A, a main frame B, supported thereon, means for adjusting the main frame on the base-frame, the wire-supporting devices C, the wire-stretching devices D, the post-driving frame E, having a guide F for the wires leading from the stretching devices, and means whereby the main frame may be adjusted laterally on the base-frame, the whole coöperating in laying the wires, driving the posts, and securing a proper alinement of the machine with the line of the fence being erected.

In the construction shown the base-frame A comprises the front and rear wheels $A'$ $A^2$ and the perch or coupling $A^3$ between the same. I also supply a suitable tongue $A^4$, having a guide-pulley $A^5$ at its inner end, and anchor-bars $A^6$ are arranged adjacent to the rear axle to prevent any rearward movement of the machine while in use, hanger-hooks $A^7$ being provided to support the anchors $A^6$ while the machine is being moved from point to point. On the front axle I mount the king-bolt G, which fits in a bearing $G'$ in the front bolster $B'$ of the main frame, such bolster being provided with a laterally-elongated slot or recess $B^2$, in which the king-bolt G plays in the tilting of the main frame to level the same when used on a hillside, as will be presently described. The rear bolster is made in sections H and $H'$, the former being secured on the rear axle and the section $H'$ being fitted over the section H, so it can rock thereon in tilting the main frame to different inclinations, as will be understood from Fig. 7. The section $H'$ is in the nature of a box or casing and fits loosely over the section H, so it can slide thereon up and down at either end and can rest in its lowermost position upon the rear axle or upon the plate $H^2$, placed thereon and forming one of the supports for the toggle-arms presently described for use in tilting the upper section of the bolster. This upper section $H'$ is practically a part of the main frame, the latter being secured to a carriage $H^3$, which slides back and forth in ways $H^4$ at the upper end of the section $H'$. This carriage $H^3$ is provided with a rack $H^5$, which is meshed by a gear $H^6$, journaled at $H^7$ in the section $H'$ and provided with a crank $H^8$ and ratchet-wheels $H^9$, having detent-pawls, as will be understood from Figs. 3 and 7. By the described construction the carriage $H^3$, at or near the rear end of the main frame B, can be moved back and forth laterally to properly adjust the main frame to the line of the fence, as may be desired. In connecting the carriage $H^3$ with the main frame it is preferred to provide said carriage with a bolt $h^3$, which plays in a slotted way $h^4$ in the main frame B.

To tilt the main frame on the rear axle to properly level such frame, I employ the toggle-arms I and I', jointed together at $I^2$, jointed at $i$ and $i'$, respectively, to the axle and to the upper section H', so said toggle-arms can be operated to tilt the section H' and with it the main frame, as will be understood from Fig. 7. In operating the toggle-arms it is preferred to connect links $I^3$ with the arms at $I^2$ and to connect said links $I^3$ with screws $I^4$, having handles $i^4$ and threaded in brackets I, so said screws $I^4$ can be turned to adjust the toggle-arms to raise or lower the rear end of the main frame at either side, the forward end of the main frame following such adjustment by means of the slotted seat $B^2$ for the king-bolt G before described.

It will be seen that by straightening both sets of toggle-arms the rear end of the main frame can be elevated bodily and that by straightening one toggle-arm one side of such frame can be raised, the extent of such adjustment being increased, when desired or necessary, by lowering the opposite side by proper manipulation of the toggle at such side, as will be understood from Fig. 7. I thus provide for adjusting the main frame both laterally, vertically, and to an angle to the horizontal and am so able to properly level such main frame and to aline it in the operation of the machine to bring the wire-stretching devices and the guides therefor on the fence-post-driver frame in proper line with the line of the fence being erected, such result being effected in an easy way without regard to the ground surface.

When the main frame is mounted on the carriage form of base shown, it is preferred to supply a brace J, extending diagonally between such main frame and the forward portion of the coupling and consisting of sections threaded and united by a turnbuckle J', so the brace can be adjusted as desired.

A suitable brake K is arranged for operation by a lever K', connected by a rod $K^2$ with a hand-lever $K^3$, as will be understood from Fig. 1.

At the rear end of the main frame B, I arrange the post-driving frame E, which is pivoted at E' at a point a short distance above its lower end to the frame B, so it can be lowered, as shown in Fig. 1, or can be raised to the full-line position illustrated in said Fig. 1 when desired for use. This frame E has upright ways for the weight $E^2$ and for the cap-plate $E^3$, to which said weight is detachably connected, preferably by means of the latch $E^4$, which engages a hook-stud $E^5$ on the weight, is held in such engagement by the spring $E^6$, and may be released by the cord $E^7$ when the weight has been elevated to the desired height. As before suggested, the frame E may be raised or lowered on its pivot E', and in raising the frame it will be found desirable to lower the weight $E^2$ to a point below the pivot E', so it will aid in raising the frame by overbalancing the longer upper end thereof.

On the frame E, I provide graduations $e$, (see Fig. 4,) so the depth to which the posts are driven can be determined or gaged. For raising and lowering the frame E, I provide a drum L, connected by cords L' and $L^2$ with the upper and lower ends of said frame, such cords being properly guided so the drum can be turned to draw upon one cord and let out the other to raise or lower the frame, as may be desired. This drum has a handle $L^3$, which is engaged by a perforated plate $L^4$, connected with the framing and operating as a detent to secure the drum in any desired adjustment. When the frame E is in the position shown in Fig. 1, the post may be placed in line below the weight $E^2$, as shown in Fig. 4, and such weight being properly connected with its carrier-plate may be raised to the desired height and then detached by drawing on the cord $E^7$, so the weight will fall. To hoist the carrier-plate and the attached weight, I provide the blocks M and M' and dispose the cable $M^2$ around the same, as will be understood from the drawings. This cable $M^2$, I use for hoisting the weight in building wire fences when horse-power is used, as will be presently described; but when it is desired to raise the weight at other times this may be done by means of the cord $N^3$, connected with the hand-operated drum $N^4$. (See Fig. 1.)

The cord or rope $M^2$ passes down through a pulley-block N and is provided in advance of said block with a number of projections N', suitably spaced apart to engage with the arms of the operating-pulley $N^2$ of the wire-stretcher, so said projections N' as they are drawn forward will operate the pulley $N^2$ and so operate the wire-stretcher as the cable $M^2$ is drawn forward to raise the post-driving weight. Suitable guides are provided at O and O' to direct the rope $M^2$ to cause its projections N' to engage the arms of the wheel $N^2$, and I also provide a shifting guide-pulley $O^2$, which can be adjusted to position to permit the projections N' to engage the wheel $N^2$ or to a position which will hold the rope $M^2$ so its projections will not engage the arms of the wheel $N^2$. This will be understood on reference to Figs. 2, 3, and 8. If the pulley $O^2$ be arranged as shown in full lines, Fig. 8, it will permit the projections N' to engage the wheel $N^2$; but if said pulley $O^2$ be shifted to the dotted-line position shown in Fig. 8 it will tend to throw the cable $M^2$ laterally clear of the wheel $N^2$, so the projections N' will not operate the wheel $N^2$. It will thus be seen that the cable $M^2$ may be caused to operate the wire-stretcher or not, as desired.

The pulley $O^2$ is carried on a lever $O^3$, which is connected with one arm of a bell-crank lever $O^4$, whose other arm is connected by a rod $O^5$ with a lever $O^6$, convenient to the driver, such lever having a suitable detent $O^7$, as will be understood from Figs. 3 and 2. The rod $O^5$ is provided with a projection $O^8$, which releases a detent $O^9$ on the wire-stretcher in the operation of shifting the pulley $O^2$ to hold the rope $M^2$ clear of the wheel $N^2$, so the shifting of the weight-lifting rope to prevent it from operating the wire-stretcher will free such wire-stretcher, as will be better understood from what follows, it being desired to free the wire-stretcher when it has been properly operated to tighten the strands and the latter have been secured to the posts in any desired manner.

I will now pass to a more detailed description of the wire-stretcher. This includes a shaft P, which is journaled at its lower end in the body of the main frame and at its upper end in a subframe P', which is mounted on the body of the main frame, as shown. The armed wheel $N^2$ is clutched to the shaft P by means of the pawl $n^2$ on said wheel engaging the ratchet-wheel $P^2$ on the shaft P, so the movement of the cable $M^2$ in its forward direction will operate the shaft P, but will turn the wheel $N^2$ back without affecting the shaft P on the rearward movement of the said cable $M^2$, as will be understood from Figs. 1 and 9. The wire-stretching spools $P^3$ are secured on and operated by the shaft P and are constructed alike and spaced apart suitable distances to suit them for use in building fences. The shaft P, with its attached spools, is secured in the position to which it may be turned by the cable $M^2$ by means of the pawl $O^9$, which engages a ratchet-wheel $P^4$ on the shaft P, such pawl $O^9$ being arranged for operation by the rod $O^5$, as before described.

Figure 13:
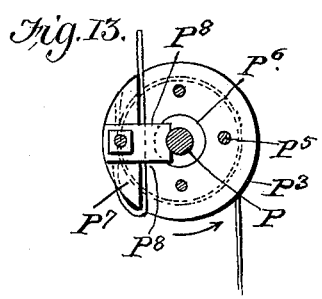

The wire-stretching spools are shown in detail in Figs. 10, 12, and 13, and to brace them together I prefer to connect the several spools by the rods $P^5$, as shown in Fig. 10. Each spool is provided with a central hub portion $P^6$ and at one side thereof a block $P^7$, spaced apart from the hub-section to form a passage at $P^8$ for the wire, which is disposed to such passage as shown in Fig. 12. If the spool be turned in the direction indicated by arrows in Figs. 12 and 13 from the position shown in Fig. 12 to that shown in Fig. 13, the wire will be tightened to the extent to which the spool may be turned and may thus be caused to attain the desired tension before nailing to the posts. By operating the wire-stretcher by the power-operated cable $M^2$, I am able to secure a high degree of tension in the wires with but little labor on the part of the operator. As shown in Fig. 10, it is preferred to support the wire-stretcher on ball-bearings by resting the lower wire-stretching spools on balls $P^9$.

To indicate audibly the position of the posts, I provide on the main frame an alarm Q, preferably a bell, whose hammer Q' is arranged in the path of knots or projections R' on a line R, which is secured at one end in suitable relation to the fence being built, passes between guides $R^2$ and $R^3$, which direct it in engagement with the hammer Q', and is wound on a suitable reel $R^4$, which is braked by a lever $R^5$ bearing upon the shaft $R^6$ of the reel $R^4$ and having suitable detent mechanism at $R^7$. As the machine moves forward the knots R', engaging the hammer Q' of the bell Q, will cause such bell to sound and the knots being spaced apart a distance corresponding to the distance apart of the posts serve to indicate the position of the posts, so the machine can be stopped each time the bell is sounded for the purpose of driving a post.

In the use of the machine I support spools S, carrying the wire, on a shaft S' in advance of the wire-stretching spools, and these spools may be spaced apart to correspond with the spacing of the strands in the fence, empty spools and filling-blocks being employed in securing the desired spacing of the wire-carrying spools.

In Fig. 5 I show the tacker-guide, which consists of the threaded shaft T, which is provided at its lower end with a treadle T' to receive the foot of the operator and has a plurality of hooks $T^2$, having shanks $T^3$ threaded upon the shaft T, so they can be turned to any desired adjustment to suit as guides for use in building the fence with the strands any desired distance apart. In the use of this tacker-guide its hooks, or so many of same as it may be desired to use, are adjusted to the desired distance apart and engaged over the strands of the fence close to the post to which such strands are to be tacked, when by pressing the treadle T' to the ground the strands are adjusted the proper distance apart and may be tacked to the post.

In the operation of my machine the posts may be scattered along the line of the fence and three flag-poles set, as shown at U in Fig. $2^a$, after driving one, two, or more posts V, as shown in Fig. $2^a$. The flag-poles U now form a guide in driving the machine forward in building the fence. The shaft S is now supplied with as many spools of wire as there are to be strands in the fence. The wire-stretcher should now be turned so that the slot or passages $P^8$ will face the pile-driver, and the strands of wire should be passed through such passage, as shown in Figs. 12 and 13, and carried forward over the arch W and back between the rollers F alongside the driver-frame, and the ends of such strands should be secured to a post the proper distance apart as desired, and the driver-frame be raised from the dotted position shown in Fig. 1 to the full-line position shown in said figure. A post may now be set in line under the weight, the latter being raised by a horse hitched to the line $M^2$ and driven forward from the machine. When the weight is at the desired height, it may be released by pulling on the cord $E^7$, (see Fig. 6,) when the weight will drop upon the post and drive the same into the ground, such operation being repeated until the post is driven the desired distance, the gage or graduation e indicating the depth to which the post is driven. After several—say three—posts have been driven the hooks on the tacker-guide may be adjusted and the wires tacked to and adjusted to the posts, as before described. As the machine moves forward the indicator devices Q and R before described will sound the alarm and tell when each succeeding post should be driven.

In building fence on the side of a hill the flag-poles may be properly set and the main frame adjusted to level the same and be shifted from side to side to the desired line. In building fence by steam an extra gearing may be applied to the ordinary farm-engine and the machine applied as desired.

Where desired, the invention may be employed on ordinary farm-wagons, those with low wheels preferred, by removing the bolsters of the wagon and placing those of the improved machine in their place.

In building fancy wire fence the roll of the wire may be placed on the shaft S and passed through the rollers F. This fancy wire fence may be tightened by means of short lengths of rope having a hook at one end to engage the wire, with the other end secured to the shaft of the stretcher.

Having thus described my invention, what I claim, and desire to secure by Letters Patent, is—

1. In a machine substantially as described the combination of the base-frame, the main frame supported thereon, the wire supporting and stretching devices on the main frame, the post-driving frame on the main frame and having a guide for the wires leading from the stretching devices, and means for adjusting the main frame on the base-frame whereby the wire stretching and guiding devices may be preserved in vertical alinement independent of the ground-surface substantially as set forth.

2. The combination of the base-frame, the main frame supported thereon, means for adjusting the main frame on the base-frame whereby to level the main frame, the wire-stretcher upon the main frame, the post-driving frame having upright guide-rolls between which the wire strands lead from the stretcher and means whereby the weight-hoisting line of the post-driver may operate the wire-stretcher substantially as set forth.

3. In an apparatus substantially as described the combination of the wire-stretcher, the post-driver having a weight and a weight-hoisting line, and means whereby the said weight-hoisting line may operate the wire-stretcher substantially as set forth.

4. An apparatus substantially as described comprising the main frame, the wire-stretcher, the post-driver provided with the weight-hoisting line and having its frame mounted on the main frame and provided with rollers forming guides for the wire leading from the stretcher, and means whereby the weight-hoisting line may operate the wire-stretcher substantially as set forth.

5. The combination substantially as described of the main frame, the base-frame, means for adjusting the main frame whereby to level the frame upon the base-frame, the wire-stretcher and post-driver frames mounted upright upon the main frame, guide-rollers on the post-driver frame for the wires leading from the stretcher, and the weight-hoisting line provided with means whereby it may operate the wire-stretcher substantially as set forth.

6. An apparatus substantially as described comprising a main frame, a post-driver frame, means for supporting the spools of wire in advance of the post-driver frame, and stretching devices between the wire-supporting devices and the post-driver frame substantially as set forth.

7. In apparatus substantially as described the combination of the wire-stretcher having a shaft and means whereby the wire is stretched as such shaft is turned, an armed wheel on said shaft, and a line provided with projections engaging the arms of said wheel substantially as set forth.

8. In apparatus substantially as described a wire-stretcher comprising the shaft having the spools, the hubs and the wire-passages alongside the hubs, and means whereby the stretcher may be rotated substantially as set forth.

9. In an apparatus substantially as described a wire-stretcher comprising a shaft provided with the stretching devices and with an armed wheel, an operating-line having projections whereby to engage said armed wheel, a guide by which the said operating-line may be held out of engagement with the armed wheel, means for adjusting this guide, and a detent for the wire-stretcher arranged for operation by the means for adjusting the guide for the line-wire substantially as set forth.

10. In an apparatus substantially as described the combination with the main frame, the post-driver frame having a weight, and a weight-hoisting line provided with projections and a wire-stretcher having an armed wheel arranged for engagement by the projections on said weight-lifting line substantially as set forth.

11. In an apparatus substantially as described the combination of the main frame, the post-driver frame, the operating-line having buttons or projections, the wire-stretcher having a shaft, and means for stretching the wire as the shaft is turned, and an armed wheel clutched on said shaft and arranged for engagement by the projections on the operating-line substantially as set forth.

12. In an apparatus substantially as described the combination of the wire-stretcher having a shaft and an armed wheel, of the operating-line having buttons or projections engaging said armed wheel, a guide whereby to hold said line clear of the armed wheel, said guide consisting of a pivoted lever having a roller engaging said line, a bell-crank lever having one arm connected with the guide-lever, and operating means connected with the other arm of the bell-crank lever substantially as set forth.

13. In an apparatus substantially as described the combination of the wire-stretcher having a shaft and an armed wheel, an operating-line having buttons or projections engaging said armed wheel, the guide for said operating-line, the bell-crank lever connected with said guide, the operating-lever and the rod connected with said bell-crank lever, such rod being provided with a projection or shoulder, and a detent-pawl for the wire-stretcher arranged to be released by said projection or shoulder on the connecting-rod substantially as set forth.

14. In an apparatus substantially as described the combination of the frame provided with post-driving devices, a reel thereon carrying a line provided with buttons or projections and an alarm carried by said frame and having guides for said line and sounding devices arranged to be operated by the buttons or projections thereon substantially as set forth.

15. In an apparatus substantially as described, the wire-stretcher having a shaft and the spools $P^3$ thereon, each spool having a hub $P^6$ and a block $P^7$ forming a wire-passage $P^8$ substantially as set forth.

16. The combination of the main frame, the post-driver frame thereon and provided with the guides for the wire, such frame and guides being jointed to the main frame and foldable thereon into and out of position for use, the wire-stretching devices on the main frame in advance of the post-driver frame, the base-frame, means for leveling the main frame on the base-frame, and means for adjusting the main frame laterally on the base-frame, substantially as set forth.

17. In an apparatus substantially as described the combination of the main frame, toggle-arms below the same at its opposite sides, and means whereby to operate the opposite toggle-arms whereby the main frame may be leveled substantially as set forth.

18. In an apparatus substantially as described the combination of the main frame, the rear bolster having a lower section, an upper section having a box or casing fitted loosely over the lower section and provided at its upper side with ways for the carriage, the toggle-arms and operating means connected with said upper section, the carriage sliding in said ways, and the main frame supported by and movable with said carriage substantially as set forth.

19. The improved machine consisting of the base-frame, the main frame thereon, the wire-stretching and post-driving devices carried by the main frame, the rear bolster between the base and main frames and provided with upper and lower sections, means for adjusting either side of the upper section vertically, and a carriage movable laterally on said upper section and supporting the main frame substantially as set forth.

MILES H. STARLING.

Witnesses:
H. RIETZ,
HARVEY HEWNIGOR.